(12) United States Patent
Kwon et al.

(10) Patent No.: US 8,772,401 B2
(45) Date of Patent: *Jul. 8, 2014

(54) FLAME-RETARDANT SCRATCH-RESISTANT THERMOPLASTIC RESIN COMPOSITION WITH IMPROVED COMPATIBILITY

(75) Inventors: Kee Hae Kwon, Gunpo-si (KR); Il Jin Kim, Ansan-si (KR)

(73) Assignee: Cheil Industries Inc., Gumi-si (KR)

( * ) Notice: Subject to any disclaimer, the term of this patent is extended or adjusted under 35 U.S.C. 154(b) by 510 days.

This patent is subject to a terminal disclaimer.

(21) Appl. No.: 12/898,012

(22) Filed: Oct. 5, 2010

(65) Prior Publication Data

US 2011/0021677 A1 Jan. 27, 2011

Related U.S. Application Data

(63) Continuation-in-part of application No. PCT/KR2008/007838, filed on Dec. 31, 2008.

(30) Foreign Application Priority Data

Apr. 14, 2008 (KR) .................. 10-2008-0034408

(51) Int. Cl.
*C08F 283/08* (2006.01)
(52) U.S. Cl.
USPC ............................ 524/508; 525/133; 525/148
(58) Field of Classification Search
USPC .................................. 524/508; 525/133, 148
See application file for complete search history.

(56) References Cited

U.S. PATENT DOCUMENTS

| | | | |
|---|---|---|---|
| 3,322,853 A | 5/1967 | Trementozzi et al. | |
| 3,839,513 A | 10/1974 | Patel | |
| 3,898,300 A | 8/1975 | Hillard | |
| 4,027,073 A | 5/1977 | Clark | |
| 4,045,514 A | 8/1977 | Iwahashi et al. | |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,303,772 A | 12/1981 | Novicky | |
| 4,391,935 A | 7/1983 | Bialous et al. | |
| 4,400,333 A | 8/1983 | Neefe | |
| 4,632,946 A | 12/1986 | Muench et al. | |
| 4,634,734 A | 1/1987 | Hambrecht et al. | |
| 4,692,488 A | 9/1987 | Kress et al. | |
| 4,745,029 A | 5/1988 | Kambour | |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,061,558 A | 10/1991 | Fischer et al. | |
| 5,061,745 A | 10/1991 | Wittmann et al. | |
| 5,200,492 A | 4/1993 | Ohnaga et al. | |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A | 7/1993 | Wroczynski | |
| 5,239,001 A | 8/1993 | Fischer et al. | |
| 5,274,031 A | 12/1993 | Eichenauer et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,306,778 A * | 4/1994 | Ishida et al. | 525/310 |
| 5,449,557 A | 9/1995 | Liebler et al. | |
| 5,451,650 A | 9/1995 | Siol et al. | |
| 5,473,019 A | 12/1995 | Siol et al. | |
| 5,605,962 A | 2/1997 | Suzuki et al. | |
| 5,627,228 A | 5/1997 | Kobayashi | |
| 5,643,981 A | 7/1997 | Yang et al. | |
| 5,672,645 A | 9/1997 | Eckel et al. | |
| 5,731,390 A | 3/1998 | van Helmond et al. | |
| 5,750,602 A | 5/1998 | Kohler et al. | |
| 5,833,886 A | 11/1998 | Dashevsky et al. | |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

International Search Report in counterpart International Application No. PCT/KR2008/007838 mailed Aug. 18, 2009.
European Search Report for commonly owned European Application No. EP 04808586, completed on Sep. 25, 2007.
Chinese Office Action in counterpart Chinese Application No. 200880128614.0 dated Mar. 7, 2012, pp. 1-5.
English-translation of Chinese Office Action in counterpart Chinese Application No. 200880128614.0 dated Mar. 7, 2012, pp. 1-2.
Search Report in commonly owned European Patent Application No. EP 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.

(Continued)

*Primary Examiner* — Peter D Mulcahy
(74) *Attorney, Agent, or Firm* — Additon, Higgins, Pendleton & Ashe, P.A.

(57) ABSTRACT

Disclosed herein is a flame-retardant scratch-resistant thermoplastic resin composition comprising (A) about 20 to about 95% by weight of a polycarbonate resin; (B) about 1 to about 50% by weight of a copolymer resin comprising (B1) about 0 to about 100% by weight of a rubber modified vinyl graft copolymer resin and (B2) about 0 to about 100% by weight of a vinyl copolymer resin; (C) about 1 to about 50% by weight of a (meth)acrylic copolymer resin with a refractive index of about 1.50 to about 1.59; and (D) about 0.1 to about 40 parts by weight of a flame retardant, per 100 parts by weight of a base resin comprising (A)+(B)+(C).

14 Claims, 3 Drawing Sheets

(56) References Cited

U.S. PATENT DOCUMENTS

| | | |
|---|---|---|
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 * | 8/2010 | Gaggar et al. ............ 524/88 |
| 7,956,127 B2 * | 6/2011 | Lee et al. ............ 525/67 |
| 8,119,726 B2 | 2/2012 | Lim et al. |
| 8,304,494 B2 | 11/2012 | Park et al. |
| 8,507,594 B2 | 8/2013 | Kwon et al. |
| 8,541,506 B2 | 9/2013 | Kwon et al. |
| 8,557,912 B2 | 10/2013 | Chung et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0100307 A1 | 5/2006 | Uerz et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1* | 2/2009 | Uejima et al. ............ 524/147 |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0240831 A1 | 9/2010 | Kim et al. |
| 2010/0256288 A1 | 10/2010 | Kim et al. |
| 2009/0100985 A1 | 1/2011 | Kwon et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0160377 A1 | 6/2011 | Chung et al. |
| 2011/0160380 A1 | 6/2011 | Kwon et al. |

FOREIGN PATENT DOCUMENTS

| | | |
|---|---|---|
| CN | 101061179 A | 10/2007 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1209163 A1 | 5/2002 |
| EP | 2204412 A1 | 7/2010 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 10-2000-0048033 A | 7/2000 |
| JP | 2001-049072 A | 2/2001 |
| JP | 2001-316580 A | 11/2001 |
| JP | 2002-080676 | 3/2002 |
| JP | 2002-348457 A | 12/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 A | 9/2006 |
| JP | 2006-342246 A | 12/2006 |
| JP | 2007-023227 A | 2/2007 |
| JP | 2008-292853 | 12/2008 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |

(56) References Cited

FOREIGN PATENT DOCUMENTS

| KR | 10-2004-0007788 A | 1/2004 |
|---|---|---|
| KR | 1020040058809 A | 7/2004 |
| KR | 2004-0079118 A | 9/2004 |
| KR | 10-0648114 B1 | 11/2006 |
| KR | 10-0767428 B1 | 10/2007 |
| KR | 885819 B1 | 2/2009 |
| KR | 10-902352 | 6/2009 |
| WO | 99 19383 A1 | 4/1999 |
| WO | 99/57198 A1 | 11/1999 |
| WO | 00 00544 A1 | 1/2000 |
| WO | 00 09518 A1 | 2/2000 |
| WO | 00/18844 A1 | 4/2000 |
| WO | 01/66634 A | 9/2001 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 A1 | 1/2007 |
| WO | 2007/119920 A1 | 10/2007 |
| WO | 2007/140101 A | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |

OTHER PUBLICATIONS

International Preliminary Report on Patentability dated Jan. 25, 2007 in commonly owned international publication No. PCT/KR2004/003457, pp. 1-23.
Notice of Allowance in commonly owned U.S. Appl. No. 12/972,795 mailed May 24, 2013, pp. 1-8.
Final Office Action in commonly owned U.S. Appl. No. 12/884,549 mailed Dec. 18, 2012, pp. 1-7.
Notice of Allowance in commonly owned U.S. Appl. No. 12/884,549 mailed Apr. 11, 2013, pp. 1-8.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011, pp. 1-9.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/631,018 mailed Nov. 8, 2011, pp. 1-10.
European Search Report in commonly owned European Application No. 10196806 dated Apr. 27, 2011, pp. 1-5.
European Search Report in commonly owned European Application No. 07024808, dated Mar. 18, 2008, pp. 1-2.
Machine Translation of JP 10-017762.
Derwent Abstract of JP 2002348457 (A) (2003).
Full English Translation of JP-10-017762 (2011).
European Search Report in commonly owned European Application No. 08873329.0 dated Dec. 14, 2012, pp. 1-7.
Office Action in commonly owned U.S. Appl. No. 12/972,795 mailed Jan. 18, 2013, pp. 1-9.
European Search Report in commonly owned European Application No. 08862371 dated Dec. 7, 2010, pp. 1-6.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
Advisory Action in commonly owned U.S. Appl. No. 12/631,018 mailed Nov. 7, 2012, pp. 1-3.
Japanese Office Action in commonly owned Japanese Application No. 2010-539284, dated Sep. 11, 2012, pp. 1-3.
International Search Report in commonly owned International Application No. PCT/KR2008/006870, dated May 28, 2009.
Office Action in commonly owned U.S. Appl. No. 12/817,302 mailed Mar. 29, 2012, pp. 1-5.
Final Office Action in commonly owned U.S. Appl. No. 12/817,302 mailed Feb. 7, 2013, pp. 1-6.
Advisory Action in commonly owned U.S. Appl. No. 12/817,302 mailed May 16, 2013, pp. 1-5.
Advisory Action in commonly owned U.S. Appl. No. 12/961,877 mailed Mar. 12, 2013, pp. 1-2.
Office Action in commonly owned U.S. Appl. No. 12/961,877 mailed Jul. 30, 2012, pp. 1-14.
Office Action in commonly owned U.S. Appl. No. 12/971,333 mailed Aug. 27, 2012, pp. 1-12.
Final Office Action in commonly owned U.S. Appl. No. 12/971,333 mailed Dec. 10, 2012, pp. 1-11.
Notice of Allowance in commonly owned U.S. Appl. No. 12/971,333 mailed Mar. 27, 2013, pp. 1-9.
Office Action in commonly owned U.S. Appl. No. 12/971,333 mailed Jul. 11, 2013, pp. 1-7.
Notice of Allowance in commonly owned U.S. Appl. No. 12/880,209 mailed Oct. 10, 2013, pp. 1-10.
Notice of Allowance in commonly owned U.S. Appl. No. 12/817,302 mailed Oct. 1, 2013, pp. 1-7.
Chinese Office Action in commonly owned Chinese Application No. 201010597679.9 dated Aug. 27, 2012, pp. 1-5.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.

* cited by examiner

*FIG. 2B* ional Application No. PCT/KR2008/007838, filed Dec. 31, 2008, pending, which designates the U.S., published as WO 2009/128601, and is incorporated herein by reference in its entirety, and claims priority therefrom under 35 USC Section 120. This application also claims priority under 35 USC Section 119 from Korean Patent Application No. 10-2008-0034408, filed Apr. 14, 2008, in the Korean Intellectual Property Office, the entire disclosure of which is also incorporated herein by reference.

FIELD OF THE INVENTION

The present invention relates to a flame-retardant scratch-resistant thermoplastic resin composition.

BACKGROUND OF THE INVENTION

Generally, thermoplastic resins have lower specific gravity than glasses and metals and can have good physical properties such as moldability and impact resistance. Recently, plastic products have rapidly replaced conventional glass or metal products, for example, as components for electrical and electronic goods, as these goods have increased in size, to provide more economical and light weight products. Accordingly, the appearance and function of the plastic products have also become increasingly important when they are used in housings of electrical and electronic goods. For example, there is a need for plastic materials which can provide scratch resistance, impact resistance, and flame retardancy.

Polycarbonate (PC) resins, in particular, blends of polycarbonate and a vinyl copolymer (such as a blend of PC and acrylonitrile-butadiene-styrene, or "ABS," copolymer) can have improved processability while maintaining high notch impact strength. Accordingly, such blends have been widely used in the production of heat-emitting large-size injection molded products such as automobile parts, computer housings, office equipment, and the like. Further, polycarbonate resins can obtain good flame retardancy even with a non-halogen flame retardant, which can be environmentally advantageous. However, polycarbonate resins have a drawback of poor scratch resistance.

In contrast, acrylate resins, such as polymethylmethacrylate resin, can have good transparency, weatherability, mechanical strength, surface gloss, adhesive strength, and excellent scratch resistance. Polymethylmethacrylate resins, however, may not have adequate impact resistance and flame retardancy for various applications.

Conventionally, a hard coating method has been used to improve the scratch resistance of plastic products. The hard coating method can include the steps of coating a surface of an injection-molded resin with an organic-inorganic hybrid material and curing the organic-inorganic hybrid material on the surface of the resin using heat or ultra violet light. However, the hard coating method requires an additional coating step, which can increase processing times and manufacturing costs and it may cause environmental problems. With recent increased interest in environmental protection and reduction of manufacturing costs, there is a need for a non-coated resin which has scratch resistance without using the hard coating method. Also, it is important to develop a resin with good scratch resistance for the housing manufacturing industry.

One attempt to improve both scratch resistance and flame retardancy alloys polycarbonate, a vinyl copolymer (such as ABS) and acrylic resin, such as polymethylmethacrylate (PMMA) to prepare a PC/ABS/PMMA resin. However, it can be difficult to obtain high transparency and colorability due to low compatibility of the resins and the differences between the refractive indices of the polycarbonate resin and ABS and acrylic resin. It can also be very difficult to use an alloy of PC and PMMA in housings of electrical and electronic products. Due to the different refractive indices of the PC resin and the PMMA resin (1.59 and 1.49, respectively), the alloy of PC resin and PMMA resin may scatter light. This can makes it difficult to provide color with high chroma, and a melt joining line is clearly shown during extrusion.

Korean Patent Publication Laid-open No. 2004-0079118 discloses a method of lowering the molecular weight of polycarbonate during a kneading process using metal stearic acid ester in order to improve the compatibility between a polycarbonate resin and a (meth)acrylate resin. However, the blend of the polycarbonate and the methacrylate resin can have significantly reduced mechanical properties.

SUMMARY OF THE INVENTION

The present inventors have developed a flame-retardant scratch-resistant thermoplastic resin composition that can have improved compatibility. The thermoplastic resin composition of the invention includes a polycarbonate resin, a vinyl resin (which can be a rubber modified vinyl graft copolymer and/or a vinyl copolymer resin), and a (meth)acrylic copolymer resin with a high refractive index. The (meth)acrylic copolymer resin with a high refractive index can reduce the difference between the refractive indices of the resins present in the composition. The flame-retardant scratch-resistant thermoplastic resin composition can also have a good balance of physical properties such as mechanical properties, scratch resistance, flame retardancy and the like. Further, the flame-retardant scratch-resistant thermoplastic resin composition can have a good appearance and high colorability by minimizing deterioration of colorability between the resins in the composition, for example between the polycarbonate resin and a (meth)acrylate resin. Accordingly, the flame-retardant scratch-resistant thermoplastic resin composition can be useful for various articles such as parts of electrical and electronic goods, parts of automobiles, lenses, or window glasses, and the like, which can require good appearance and high colorability.

Other aspects, features and advantages of the present invention will be apparent from the ensuing disclosure and appended claims.

An aspect of the present invention provides a flame-retardant scratch-resistant thermoplastic resin composition comprising (A) about 20 to about 95% by weight of a polycarbonate resin; (B) about 1 to about 50% by weight of a copolymer resin comprising (B1) about 0 to about 100% by weight of a rubber modified vinyl graft copolymer resin and (B2) about 0 to about 100% by weight of a vinyl copolymer resin; (C) about 1 to about 50% by weight of a (meth)acrylic copolymer resin with a refractive index of about 1.50 to about 1.59; and (D) about 0.1 to about 40 parts by weight of a flame retardant, per 100 parts by weight of a base resin comprising (A)+(B)+(C).

In an exemplary embodiment, the flame-retardant scratch-resistant thermoplastic resin composition may comprise (A) about 50 to about 70% by weight of a polycarbonate resin; (B)

about 10 to about 40% by weight of a copolymer resin comprising (B1) about 30 to about 70% by weight of a rubber modified vinyl graft copolymer resin and (B2) about 30 to about 70% by weight of a vinyl copolymer resin; and (C) about 5 to about 40% by weight of a (meth)acrylic copolymer resin with a refractive index of about 1.50 to about 1.59 and (D) about 10 to about 40 parts by weight of a flame retardant, per 100 parts by weight of a base resin comprising (A)+(B)+(C).

The base resin may further comprise less than about 50% by weight of a (meth)acrylic resin (E). In exemplary embodiments, the (meth)acrylic resin (E) may be used in an amount of about 1 to about 20% by weight.

The rubber modified vinyl graft copolymer resin (B1) may be a copolymer or a mixture of copolymers obtained by graft-polymerizing about 50 to about 95% by weight of an aromatic vinyl compound, $C_1$-$C_8$ (meth)acrylic acid alkyl ester compound, or a mixture thereof, and about 5 to about 95% by weight of vinyl cyanide compound, $C_1$-$C_8$ (meth) acrylic acid alkyl ester compound, maleic anhydride, $C_1$ to $C_4$ alkyl- or phenyl N-substituted maleimide, or a mixture thereof, onto about 5 to about 95% by weight of rubbery polymer.

The vinyl copolymer (B2) may be a copolymer or a mixture of copolymers comprising about 50 to about 95% by weight of an aromatic vinyl compound, $C_1$-$C_8$ (meth)acrylic acid alkyl ester compound, or a mixture thereof, and about 5 to about 50% by weight of a vinyl cyanide compound, $C_1$-$C_8$ (meth)acrylic acid alkyl ester compound, maleic anhydride, $C_1$ to $C_4$ alkyl- or phenyl N-substituted maleimide, or a mixture thereof.

The (meth)acrylic copolymer resin (C) may include a homopolymer, a copolymer, or a mixture thereof, of an aromatic methacrylate, an aliphatic methacrylate, or a mixture thereof. In an exemplary embodiment, the (meth)acrylic copolymer resin (C) may include a copolymer of an aromatic methacrylate or an aliphatic methacrylate and a mono-functional unsaturated monomer.

In exemplary embodiments, the (meth)acrylic copolymer resin (C) may include a copolymer including about 20 to about 100% by weight of an aromatic methacrylate, an aliphatic methacrylate, or a mixture thereof and about 0 to about 80% by weight of a mono-functional unsaturated monomer.

Exemplary mono-functional unsaturated monomers include without limitation at least one monomer selected from the group consisting of methacrylic acid ester monomers, acrylic acid ester monomers, unsaturated carboxylic acid monomers, acid anhydride monomers, hydroxyl group containing ester monomers, amide monomers, unsaturated nitrile monomers, allyl glycidyl ethers, glycidyl methacrylates, aromatic vinyl compounds, and mixtures thereof. In an exemplary embodiment, the mono-functional unsaturated monomer may be at least one monomer selected from the group consisting of methacrylic acid ester monomers including methyl methacrylate, ethyl methacrylate, propyl methacrylate, butyl methacrylate, phenyl methacrylate, phenoxyethyl methacrylate and benzyl methacrylate; acrylic acid ester monomers including methyl acrylate, ethyl acrylate, propyl acrylate, butyl acrylate, and 2-ethyl hexyl acrylate; unsaturated carboxylic acid monomers including acrylic acid and methacrylic acid; acid anhydride monomers including maleic anhydride; hydroxyl group containing ester monomers including 2-hydroxyethyl acrylate, 2-hydroxypropyl acrylate, and monoglycerol acrylate; amide monomers including acryl amide and methacryl amide; nitrile monomers including acrylonitrile and methacrylonitrile; allyl glycidyl ethers; glycidyl methacrylates; aromatic vinyl compounds such as styrenic monomers including styrene and α-methyl styrene; and mixtures thereof.

The (meth)acrylic copolymer resin (C) may have a weight average molecular weight of about 5,000 to about 300,000.

The flame retardant (D) may be at least one selected from phosphorus-containing flame retardants, halogen-containing flame retardants, and inorganic flame retardants.

The (meth)acrylic resin (E) may be a homopolymer of a $C_1$-$C_8$ alkyl (meth)acrylic monomer, a copolymer of two or more $C_1$-$C_8$ alkyl (meth)acrylic monomers, or a mixture thereof.

The thermoplastic resin composition may further comprise at least one additive selected from the group consisting of surfactants, nucleating agents, coupling agents, fillers, plasticizers, impact modifiers, antimicrobials, release agents, thermal stabilizers, antioxidants, light stabilizers, compatibilizers, inorganic fillers, coloring agents, stabilizers, lubricants, antistatic agents, pigments, dyes, flameproof agents, and the like. These additives may be used alone or in combination with one another.

Another aspect of the present invention provides molded articles produced from the foregoing resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin of the present invention may be prepared by any conventional method well known to those skilled in the art. For example, the polycarbonate resin may be prepared by reacting dihydric phenol compound with phosgene in the presence of a catalyst and a molecular weight controlling agent. Also, the polycarbonate resin may be prepared by transesterification of a carbonate precursor such as dihydric phenol compound and diphenylcarbonate.

The dihydric phenol compound may be a bisphenol compound, such as 2,2-bis(4-hydroxyphenyl)propane (bisphenol A). The bisphenol A may be partially or totally substituted with another dihydric phenol. In addition to bisphenol A, other examples of dihydric phenols may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, and the like, as well as halogenated bisphenol such as 2,2-bis(3,5-dibromo-4-hyroxyphenyl)propane, and mixtures thereof.

However, the dihydric phenol compound applicable for preparing the polycarbonate resin is not limited to the aforementioned compounds, and any dihydric phenol compound may be used.

The polycarbonate resin used in the present invention may be a homopolymer, a copolymer of two or more types of dihydric phenols, or a mixture thereof.

Examples of polycarbonate resin useful in the present invention may also include, without limitation, linear polycarbonate resin, branched polycarbonate resin, polyester carbonate copolymer resin and the like, and mixtures thereof.

Exemplary linear polycarbonate resins may include, without limitation, bisphenol A-based polycarbonate resins. Exemplary branched polycarbonate resins may be prepared, without limitation, by reacting one or more poly-functional aromatic compounds such as trimelitic anhydride, trimelitic acid, and the like, with one or more dihydric phenol compounds and carbonate precursors. Exemplary polyester carbonate copolymer resins may also be prepared, without limitation, by reacting di-functional carboxylic acid with one or more dihydric phenol compounds and carbonate precursors. The linear polycarbonate resin, the branched polycarbonate resin and the polyester carbonate copolymer resin can be used alone or in combination with one another.

In an exemplary embodiment, the polycarbonate resin may have a weight average molecular weight of about 10,000 to about 200,000 g/mol, for example about 15,000 to about 80,000 g/mol, or about 20,000 to about 50,000 g/mol.

The polycarbonate resin is a component of a base resin including polycarbonate resin (A), copolymer resin (B), (meth)acrylic copolymer resin (C), and optionally (meth) acrylic resin (E), when present, as discussed herein. According to the present invention, the base resin of the thermoplastic resin composition may include the polycarbonate resin in an amount of about 20 to about 95% by weight, based on the total weight of the base resin (A)+(B)+(C) and optionally resin (E), when present, as discussed herein. In exemplary embodiments, the polycarbonate resin may be used in an amount of about 40 to about 90% by weight, for example about 45 to about 80% by weight. In other exemplary embodiments, the polycarbonate resin may be used in an amount of about 51 to about 85% by weight. In other exemplary embodiments, the polycarbonate resin may be used in an amount of about 85 to about 95% by weight. In other exemplary embodiments, the polycarbonate resin may be used in an amount of about 30 to about 50% by weight. In some embodiments, the base resin of the thermoplastic resin composition may include the polycarbonate resin in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the polycarbonate resin can be in a range from about any of the foregoing amounts to about any other of the foregoing amounts. Within these ranges, good mechanical properties and scratch resistance can be obtained.

(B) Copolymer Resin

The copolymer resin (B) of the present invention is a component of a base resin including polycarbonate resin (A), copolymer resin (B), (meth)acrylic copolymer resin (C), and optionally (meth)acrylic resin (E), when present, as discussed herein. The copolymer resin (B) may comprise (B1) about 0 to about 100% by weight of a rubber modified vinyl graft copolymer resin and (B2) about 0 to about 100% by weight of a vinyl copolymer resin.

In some embodiments, the rubber modified vinyl graft copolymer resin (B1) may not be present (0% by weight of the (B1) rubber modified vinyl graft copolymer resin), although at least one of (B1) or (B2) is present (i.e., (B1) and (B2) are not both present in an amount of 0% by weight). In some embodiments, the rubber modified vinyl graft copolymer resin (B1) may be present, i.e., the copolymer resin (B) may include the rubber modified vinyl graft copolymer resin (B1) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the amount of the rubber modified vinyl graft copolymer resin (B1) can be in a range from about any of the foregoing amounts to about any other of the foregoing amounts.

In some embodiments, the vinyl copolymer resin (B2) may not be present (0% by weight of (B2) the vinyl copolymer resin), although at least one of (B1) or (B2) is present (i.e., (B1) and (B2) are not both present in an amount of 0% by weight). In some embodiments, the vinyl copolymer resin (B2) may be present, i.e., the copolymer resin (B) may include the vinyl copolymer resin (B2) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the amount of the vinyl copolymer resin (B2) can be in a range from about any of the foregoing amounts to about any other of the foregoing amounts.

In an exemplary embodiment, the copolymer resin (B) may comprise (B1) about 10 to about 60% by weight of a rubber modified vinyl graft copolymer resin and (B2) about 40 to about 90% by weight of a vinyl copolymer resin. In another exemplary embodiment, the copolymer resin (B) may comprise (B1) about 51 to about 90% by weight of a rubber modified vinyl graft copolymer resin and (B2) about 10 to about 49% by weight of a vinyl copolymer resin.

The base resin of the thermoplastic resin composition can include the copolymer resin (B) in an amount of about 1 to about 50% by weight, for example about 10 to about 40% by weight, and as another example about 15 to about 30% by weight, based on the total weight of the base-resin (A)+(B)+ (C) and optionally (meth)acrylic resin (E), when present, as discussed herein. In some embodiments, the copolymer resin (B) may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the copolymer resin (B) can be in a range from about any of the foregoing amounts to about any other of the foregoing amounts.

(B1) Rubber Modified Vinyl Graft Copolymer

The rubber modified vinyl graft copolymer according to the present invention can be a copolymer or a mixture of copolymers obtained by graft-polymerizing about 50 to about 95% by weight of an aromatic vinyl compound, $C_1$-$C_8$ (meth) acrylic acid alkyl ester compound, or a mixture thereof, and about 5 to about 95% by weight of vinyl cyanide compound, $C_1$-$C_8$ (meth)acrylic acid alkyl ester compound, maleic anhydride, $C_1$-$C_4$ alkyl- or phenyl N-substituted maleimide, or a mixture thereof, onto about 5 to about 95% by weight of rubbery polymer.

In some exemplary embodiments, the rubber modified vinyl graft copolymer may be prepared by graft-polymerizing about 5 to about 95% by weight of a monomer mixture comprising 50 to 95% by weight of styrene, α-methylstyrene, halogen- or alkyl-substituted styrene, $C_1$-$C_8$ methacrylic acid alkyl ester, $C_1$-$C_8$ acrylic acid alkyl ester, or a mixture thereof, and about 5 to about 50% by weight of acrylonitrile, methacrylonitrile, $C_1$-$C_8$ methacrylic acid alkyl ester, $C_1$-$C_8$ acrylic acid alkyl ester, maleic anhydride, $C_1$-$C_4$ alkyl- or phenyl N-substituted maleimide or a mixture thereof onto about 5 to about 95% by weight of a rubbery polymer.

The $C_{1-8}$ methacrylic acid alkyl ester or the $C_{1-8}$ acrylic acid alkyl ester can be prepared by the reaction of a monohydric alcohol containing 1 to 8 carbon atoms with an acrylic acid or a methacrylic acid, respectively. Examples of suitable acid alkyl esters include without limitation methacrylic acid methyl ester, methacrylic acid ethyl ester, methacrylic acid propyl ester, acrylic acid methyl ester, acrylic acid ethyl ester, acrylic acid propyl ester, and the like, and mixtures thereof.

Examples of the rubbery polymer may include without limitation butadiene rubber, acrylic rubber, ethylene/propylene rubber, styrene/butadiene rubber, acrylonitrile/butadiene rubber, isoprene rubber, ethylene-propylene-diene terpolymer (EPDM), polyorganosiloxane/polyalkyl(meth)acrylate rubber complex, and the like. These rubbery polymers may be used alone or in combination with one another.

In an exemplary embodiment, the rubber modified vinyl graft copolymer (B1) may be a copolymer prepared by graft-copolymering a monomer mixture comprising styrene, acrylonitrile, and selectively a (meth)acrylic acid alkyl ester, onto a butadiene rubber, acrylic rubber or styrene/butadiene rubber.

In another exemplary embodiment, the rubber modified vinyl graft copolymer (B1) may be a copolymer prepared by graft-copolymering a (meth)acrylic acid methyl ester onto a butadiene rubber, acrylic rubber or styrene/butadiene rubber.

In exemplary embodiments, the graft copolymer is an ABS graft copolymer.

The rubber polymer may have an average particle size of about 0.05 to about 4 μm, which can be useful to improve the impact resistance and the appearance of a molded article.

The graft copolymer can be prepared through a conventional polymerization process such as emulsion polymerization, suspension polymerization, solution polymerization, or bulk polymerization. Among these processes, emulsion or bulk polymerization can be useful, in which the vinyl monomers are added to the rubber polymer using an initiator.

(B2) Vinyl Copolymer

The vinyl copolymer (B2) of the present invention can be a copolymer or a mixture of copolymers comprising about 50 to about 95% by weight of an aromatic vinyl compound, $C_1$-$C_8$ (meth)acrylic acid alkyl ester compound, or a mixture thereof, and about 5 to about 50% by weight of vinyl cyanide compound, $C_1$-$C_8$ (meth)acrylic acid alkyl ester compound, maleic anhydride, $C_1$-$C_4$ alkyl- or phenyl N-substituted maleimide, or a mixture thereof.

In an exemplary embodiment, the vinyl copolymer (B2) of the present invention can be a copolymer or a mixture of copolymers prepared by copolymerizing about 50 to about 95% by weight of styrene, α-methylstyrene, halogen- or alkyl-substituted styrene, $C_1$-$C_8$ methacrylic acid alkyl ester, $C_1$-$C_8$ acrylic acid alkyl ester, or a mixture thereof, and about 5 to about 50% by weight of acrylonitrile, methacrylonitrile, $C_1$-$C_8$ methacrylic acid alkyl ester, $C_1$-$C_8$ acrylic acid alkyl ester, maleic anhydride, $C_1$-$C_4$ alkyl- or phenyl N-substituted maleimide or a mixture thereof.

The $C_{1-8}$ methacrylic acid alkyl ester or the $C_{1-8}$ acrylic acid alkyl ester can be prepared by the reaction of a monohydric alcohol containing 1 to 8 carbon atoms with an acrylic acid or a methacrylic acid, respectively. Examples of suitable acid alkyl esters include without limitation methacrylic acid methyl ester, methacrylic acid ethyl ester, acrylic acid methyl ester, acrylic acid ethyl ester, acrylic acid propyl ester, methacrylic acid propyl ester, and the like, and mixtures thereof.

The vinyl copolymer (B2) can be produced as a by-product when preparing the rubber modified vinyl graft copolymer (B1). The by-products are primarily produced when a large quantity of monomers are grafted onto a small amount of rubber polymer or when a chain transfer agent is used in excess. The amount of the vinyl copolymer (B2) to be used in this invention does not include the amount of the by-products that might be produced during preparation of the rubber modified vinyl graft copolymer (B1).

Examples of suitable vinyl copolymer (B2) can include those prepared from a monomer mixture of styrene, acrylonitrile, and optionally methacrylic acid methyl ester; a monomer mixture of α-methyl styrene, acrylonitrile, and optionally methacrylic acid methyl ester; or a monomer mixture of styrene, α-methyl styrene acrylonitrile, and optionally methacrylic acid methyl ester.

The vinyl copolymer can be prepared by an emulsion, suspension, solution, or bulk process, and can have a weight average molecular weight ($M_w$) of about 15,000 to about 200,000.

Other examples of suitable vinyl copolymers (B2) can include those prepared from a mixture of methacrylic acid methyl ester monomers and optionally acrylic acid methyl ester monomers or acrylic acid ethyl ester monomers. The methacrylic acid methyl ester polymer can be prepared by an emulsion, suspension, solution or bulk process, and can have a weight average molecular weight ($M_w$) of about 20,000 to about 250,000.

Yet another suitable vinyl copolymer (B2) can include a copolymer of styrene and maleic anhydride, which can be prepared by a continuous bulk process and a solution process. The maleic anhydride can be used in the amount of about 5 to about 50% by weight. The copolymer of styrene and maleic anhydride can have a weight average molecular weight ($M_w$) of about 20,000 to about 200,000 and an intrinsic viscosity of about 0.3 to about 0.9 dl/g.

The styrene monomer for preparation of the vinyl copolymers (B2) in this invention can be replaced by p-methylstyrene, vinyltoluene, 2,4-dimethylstyrene, α-methylstyrene, or a combination thereof.

(C) (Meth)acrylic Copolymer Resin

The (meth)acrylic copolymer resin (C) may include a homopolymer, a copolymer, or mixture thereof, of one or more aromatic methacrylates, aliphatic methacrylates, or a mixture thereof. In an exemplary embodiment, the (meth)acrylic copolymer resin (C) may include a copolymer of an aromatic methacrylate or an aliphatic methacrylate and a mono-functional unsaturated monomer.

The aromatic methacrylate or aliphatic methacrylate may be represented by the following Chemical Formula 1, Chemical Formula 2, or a mixture thereof.

[Chemical Formula 1]

wherein m is an integer from 0 to 10, and X comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

[Chemical Formula 2]

wherein m is an integer from 0 to 10, Y is oxygen (O) or sulfur (S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Exemplary aromatic methacrylates and aliphatic methacrylates may include, but are not limited to, cyclohexyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, and 2-(4-benzylphenyl)ethyl methacrylate. These may be used alone or in combination with one another.

Exemplary mono-functional unsaturated monomers may include, without limitation, methacrylic acid esters; acrylic acid esters; unsaturated carboxylic acid monomers, acid anhydrides; hydroxyl group containing esters; amides; unsaturated nitriles; allyl glycidyl ethers; glycidyl methacrylates; aromatic vinyl monomers; and the like; and mixtures thereof. In exemplary embodiments, the mono-functional unsaturated monomer may include methacrylic acid ester monomer, such as but not limited to ethyl methacrylate, propyl methacrylate, butyl methacrylate and benzyl methacrylate; acrylic acid ester monomer such as but not limited to methyl acrylate, ethyl acrylate, propyl acrylate, butyl acrylate, and 2-ethyl hexyl acrylate; unsaturated carboxylic acid monomer such as but not limited to acrylic acid and methacrylic acid; acid anhydride monomer such as but not limited to maleic anhydride; hydroxyl group containing ester monomer such as but not limited to 2-hydroxyethyl acrylate, 2-hydroxypropyl acrylate, and monoglycerol acrylate; amide monomer such as but not limited to acryl amide and methacryl amide; nitrile monomer such as but not limited to acrylonitrile and methacrylonitrile; allyl glycidyl ether; glycidyl methacrylate; aromatic vinyl monomer such as styrenic monomer such as but not limited to styrene and α-methyl styrene, and the like. These may be used alone or in combination with one another.

In an exemplary embodiment, the (meth)acrylic copolymer resin (C) may be prepared by copolymerizing about 20 to about 100% by weight of the aromatic methacrylate, aliphatic methacrylate or a mixture thereof and about 0 to about 80% by weight of the mono-functional unsaturated monomer.

In some embodiments, the aromatic methacrylate, aliphatic methacrylate or mixture thereof may be present in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the amount of the aromatic methacrylate, aliphatic methacrylate or mixture thereof can be in a range from about any of the foregoing amounts to about any other of the foregoing amounts.

In some embodiments, the mono-functional unsaturated monomer may not be present (0% by weight). In some embodiments, the mono-functional unsaturated monomer may be present, i.e., the (meth)acrylic copolymer resin of the present invention may include the mono-functional unsaturated monomer in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the mono-functional unsaturated monomer can be in a range from about any of the foregoing amounts to about any other of the foregoing amounts.

If the amount of the aromatic methacrylate, aliphatic methacrylate, or mixture thereof is less than about 20% by weight, the (meth)acrylic copolymer resin may have an average refractive index of less than about 1.50. In another exemplary embodiment, the (meth)acrylic copolymer resin (C) may be prepared by copolymerizing about 50 to about 90% by weight of the aromatic methacrylate, aliphatic methacrylate, or mixture thereof and about 10 to about 50% by weight of the mono-functional unsaturated monomer. In other exemplary embodiment, the (meth)acrylic copolymer resin (C) may be prepared by copolymerizing about 60 to about 80% by weight of the aromatic methacrylate, aliphatic methacrylate, or mixture thereof and about 20 to about 40% by weight of the mono-functional unsaturated monomer.

The (meth)acrylic copolymer resin may be prepared by conventional methods such as bulk polymerization, emulsion polymerization, and suspension polymerization.

The (meth)acrylic copolymer resin (C) of the present invention can have a higher refractive index than that of conventional (meth)acrylic copolymers. The (meth)acrylic copolymer resin with a high refractive index may be prepared to have a refractive index of about 1.50 to about 1.59, whereas conventional polycarbonate resins have a refractive index of about 1.59 and polymethylmethacrylate has a refractive index of about 1.49. In exemplary embodiments, the (meth)acrylic copolymer resin (C) may have a refractive index of about 1.52 to about 1.58, while in other exemplary embodiments, the (meth)acrylic copolymer resin may have a refractive index of about 1.53 to about 1.575.

Because the (meth)acrylic copolymer resin (C) of the present invention may have a high refractive index, thereby decreasing the difference between the refractive index of the polycarbonate resin and the (meth)acrylic copolymer resin (C), it is possible to obtain a resin composition having good transparency, when it is blended with polycarbonate resin.

When a mixture of the (meth)acrylic copolymer resin (C) and the (meth)acrylic resin (E) is blended with the polycarbonate resin (A), the difference between the refractive index of the (meth)acrylic resin (E) and the refractive index of the polycarbonate may be lowered due to the increased refractive index of the (meth)acrylic copolymer resin (C). Therefore, it is possible to prevent the deterioration of transparency and colorability usually occurring in a conventional mixture of the (meth)acrylic resin (E) and a polycarbonate resin (A) due to the difference between the refractive index of the two resins.

The (meth)acrylic copolymer resin (C) may have a weight average molecular weight of about 5,000 to about 300,000. In an exemplary embodiment, the (meth)acrylic copolymer resin (C) may have a weight average molecular weight of about 100,000 to about 250,000 or about 110,000 to about 200,000. In another exemplary embodiment, the (meth)acrylic copolymer resin (C) may have a weight average molecular weight of about 10,000 to about 70,000 g/mol. In another exemplary embodiment, the (meth)acrylic copolymer resin (C) may have a weight average molecular weight of about 5,000 to about 10,000 g/mol.

The (meth)acrylic copolymer resin (C) is a component of a base resin including polycarbonate resin (A), copolymer resin (B), (meth)acrylic copolymer resin (C), and optionally (meth)acrylic resin (E), when present, as discussed herein. The (meth)acrylic copolymer resin (C) may be used in an amount of about 1 to about 50% by weight, for example about 5 to about 40% by weight, and as another example about 10 to about 35% by weight, based on the total weight of the base resin (A)+(B)+(C) and optionally (meth)acrylic resin (E), when present, as discussed herein. In some embodiments, the base resin of the thermoplastic resin composition may include the (meth)acrylic copolymer resin (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (meth)acrylic copolymer resin (C) can be in a range from about any of the foregoing amounts to about any other of the foregoing amounts.

(D) Flame Retardant

The flame retardant of the present invention may be at least one selected from phosphorus-containing flame retardants, halogen-containing flame retardants; inorganic flame retardants, and mixtures thereof, without limitation.

In an exemplary embodiment, the flame retardant may be a phosphorus-containing flame retardant. Examples of the phosphorous-containing flame retardants may include, but are not limited to, phosphates, phosphonates, phosphinates, phosphine oxides, phosphazenes, metal salts thereof, and the like, and mixtures thereof.

The phosphate may be an aromatic phosphoric ester compound represented by the following Chemical Formula 3:

[Chemical Formula 3]

wherein $R_1$, $R_2$, $R_4$, and $R_5$ are independently $C_6$-$C_{20}$ aryl or $C_1$-$C_{12}$ alkyl substituted $C_6$-$C_{20}$ aryl; $R_3$ is a derivative of a dialcohol such as resorcinol, hydroquinol, bisphenol-A, bisphenol-S and the like; and n is about 0 to about 5.

In exemplary embodiments, $R_1$, $R_2$, $R_4$, and $R_5$ are independently phenyl or phenyl substituted with $C_1$-$C_{12}$ alkyl such as methyl, ethyl, isopropyl, t-butyl, isobutyl, isoamyl, t-amyl, and the like. In exemplary embodiments, $R_1$, $R_2$, $R_4$, and $R_5$ are independently phenyl or phenyl substituted with methyl, ethyl, isopropyl, or t-butyl.

In an exemplary embodiment, the aromatic phosphoric ester compound represented by the Chemical Formula 3 may be a monomer or oligomer having an average value of n of about 0 to about 3. In an exemplary embodiment, a phosphoric ester compound wherein n is 0, 1, 2, or 3 can be used alone or in combination with one another.

In another exemplary embodiment, the aromatic phosphoric ester compound may be used in combination with other phosphorus-containing flame retardants.

In another exemplary embodiment, the flame retardant may be a conventional halogen-containing flame retardant. Examples of the halogen-containing flame retardant may include, without limitation, decabromo diphenylether, decabromo diphenylethane, tetrabromo bisphenol A, tetrabromo bisphenol A-epoxy oligomer, octabromo trimethylphenyl phosphate, ethylene bistetrabromophthalimide, tris(tribromophenol)triazine, brominated polystyrene, and the like, and mixtures thereof. In exemplary embodiments, a halogen-containing compound which is able to melt at conventional process temperatures, for example, a halogen-containing compound having a melting point or a softening point under about 250° C. may be used.

In exemplary embodiments, when the halogen-containing compound is used, inorganic compounds such as antimony trioxide and antimony pentoxide may be used together depending on its use.

The thermoplastic resin composition may include the flame retardant (D) in an amount of about 0.1 to about 40 parts by weight, for example about 1 to about 30 parts by weight, and as another example about 10 to about 25 parts by weight, per 100 parts by weight of the base resin (A)+(B)+(C), and optionally (E), when present, as discussed herein. In some embodiments, the thermoplastic resin composition may include the flame retardant (D) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the flame retardant (D) can be in a range from about any of the foregoing amounts to about any other of the foregoing amounts.

(E) (Meth)acrylic Resin

The resin composition of the present invention may optionally further comprise a (meth)acrylic resin (E). The (meth)acrylic resin (E) may be a homopolymer, a copolymer, or mixture thereof, of one or more of $C_{1-8}$ alkyl (meth)acrylic monomers, or a mixture thereof. In addition, the (meth)acrylic resin may have a linear structure.

Examples of the (meth)acrylic monomer may include, but are not limited to, methyl methacrylate, ethyl methacrylate, n-propyl methacrylate, n-butyl methacrylate, methyl acrylate, ethyl acrylate, propyl acrylate, butyl acrylate, 2-ethylhexyl acrylate, 2-ethylhexyl methacrylate, and the like. These (meth)acrylic monomers may be used alone or in combination with one another.

The (meth)acrylic resin (E) may be prepared by conventional methods such as bulk polymerization, emulsion polymerization, and suspension polymerization.

Further, the (meth)acrylic resin may be a homopolymer, a copolymer of two types or more of (meth)acrylic monomers, or a mixture of homopolymer(s) and/or copolymer(s).

The thermoplastic resin composition may optionally include the (meth)acrylic resin (E) in an amount of about 50% by weight or less, which may be added to (A) polycarbonate resin, (B) copolymer resin, and (C) (meth)acrylic copolymer resin as a part of the base resin. In an exemplary embodiment, the (meth)acrylic resin (E) may be used in an amount of about 1 to about 35% by weight, based on the total weight of the base resin (A)+(B)+(C)+(E). In another exemplary embodiment, the (meth)acrylic resin (E) may be used in an amount of about 5 to about 20% by weight. In some embodiments, the base resin of the thermoplastic resin composition of the invention may not include the (meth)acrylic copolymer resin (E) (0% by weight). In some embodiments, the (meth)acrylic copolymer resin (E) may be present, i.e., the base resin of the thermoplastic resin composition of the present invention may include the (meth)acrylic copolymer resin in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (meth)acrylic copolymer resin (E) can be in a range from about any of the foregoing amounts to about any other of the foregoing amounts.

The thermoplastic resin composition may further comprise one or more additives such as but not limited to surfactants, nucleating agents, coupling agents, fillers, plasticizers, impact modifiers, antimicrobials, release agents, thermal stabilizers, antioxidants, light stabilizers, compatibilizer, inorganic fillers, coloring agents, stabilizers, lubricants, antistatic agents, pigments, dyes, flameproof agents, and the like. These additives may be used alone or in combination with one another. The additive(s) may be used in conventional amounts, such as about 0.01 to about 30 parts by weight, per 100 parts by weight of the base resin including (A)+(B)+(C), and optionally (E) when present.

The resin composition of the present invention may be prepared by conventional method. For example, the aforementioned components and optionally other additives may be mixed together in a mixer and the mixture may be melt-extruded through a conventional extruder into a pellet form, and then the resin pellets may be used to prepare plastic molded articles, for example by injection and extrusion processes as known in the art.

Since the thermoplastic resin composition can have excellent scratch resistance, colorability, and transparency, the thermoplastic resin composition may be molded into various articles such as housings or parts of electrical and electronic goods, parts of automobiles, lenses, window glasses, and the like.

In exemplary embodiments, the scratch-resistant thermoplastic resin composition may be used in housings of electrical and electronic products such as TVs, audio sets, washing machines, cassette players, MP3 players, telephones, game devices, video players, computers, photocopiers, and the like.

In another exemplary embodiment, the scratch-resistant thermoplastic resin composition may be used for internal or external parts of automobiles such as dashboard panels, instrumental panels, door panels, quarter panels, wheel covers, and the like.

The molding methods may include, but are not limited to, extrusion, injection, or casting molding, and may be easily carried out by those skilled in the art.

The invention may be better understood by reference to the following examples which are intended for the purpose of illustration and are not to be construed as in any way limiting the scope of the present invention, which is defined in the claims appended hereto

EXAMPLE (A) Polycarbonate Resin

Bisphenol-A linear polycarbonate with a weight average molecular weight of 25,000 (Mw) manufactured by Teijin Chemicals Ltd. of Japan (product name: PANLITE L-1250 WP) is used.

(B) Copolymer Resin (B1) ABS Graft Copolymer Resin 45 parts of polybutadiene rubber latex (solid content), 39 parts by weight of styrene, 16 parts by weight of acrylonitrile and 150 parts by weight of deionized water are mixed. To the mixture, 1.0 part by weight of potassium oleate, 0.4 parts by weight of cumenhydroperoxide, and 0.3 parts by weight of t-dodecyl mercaptan chain transfer agent are added. The blend is kept at 75° C. for 5 hours to obtain an ABS graft copolymer (g-ABS) latex. To the g-ABS latex, 1% sulfuric acid solution is added, coagulated and dried to obtain a graft copolymer resin (g-ABS) in powder form.

(B2) SAN Copolymer Resin 76 parts by weight of styrene, 24 parts by weight of acrylonitrile, and 120 parts of deionized water are mixed. To the mixture, 0.17 parts by weight of azobisisobutylonitrile (AIBN), 0.4 parts by weight of t-dodecyl mercaptan chain transfer agent, and 0.5 parts by weight of tricalciumphosphate are added. The mixture is suspension polymerized at 75° C. for 5 hours, and a styrene-acrylonitrile (SAN) copolymer resin is obtained. The resultant copolymer is washed, dehydrated and dried to obtain SAN copolymer resin having a weight average molecular weight of 150,000 g/mol in powder form.

(C) (Meth)acrylic Copolymer Resin with High Refractive Index (C1) (Meth)acrylic Copolymer with High Refractive Index-1

The (meth)acrylic copolymer with high refractive index is prepared by suspension polymerizing 30 parts by weight of a methylmethacrylate monomer and 70 parts by weight of phenyl methacrylate with a refractive index of 1.570. The resulting copolymer has a refractive index of 1.546 and a weight average molecular weight of 120,000 g/mol.

(C2) (Meth)acrylic Copolymer with High Refractive Index-2

The (meth)acrylic copolymer with high refractive index is prepared by suspension polymerizing 50 parts by weight of a methylmethacrylate monomer and 50 parts by weight of phenyl methacrylate with a refractive index of 1.570. The resulting copolymer has a refractive index of 1.530 and a weight average molecular weight of 120,000 g/mol.

(D) Flame Retardant

Bisphenol A diphosphate manufactured by Daihachi Chemical Industry Co., Ltd. of Japan (product name: CR-741) is used.

(E) (Meth)acrylic Resin

Polymethylmethacrylate resin with a weight average molecular weight of 92,000 (Mw) manufactured by LG MMA Ltd. of South Korea (product name: L84) is used.

Examples 1 to 5

The components as shown in Table 1 are added to a conventional mixer, and the mixture is extruded through a conventional twin screw extruder (L/D=29, Φ=45 mm) to prepare a product in pellet form. The pellets are dried at 80° C. for 6 hours and then molded into test specimens using a 6 oz injection molding machine.

Comparative Examples 1~3

Comparative Example 1 is prepared in the same manner as in the Example 1 except that the (meth)acrylic copolymer resin (C) of the present invention is not used.

Comparative Example 2 is prepared in the same manner as in the Example 1 except that (meth)acrylic resin (E) instead of the (meth)acrylic copolymer resin (C) is used.

Comparative Example 3 is prepared in the same manner as in the Example 5 except that (meth)acrylic resin (E) instead of the (meth)acrylic copolymer resin (C) is used.

Figure 1:
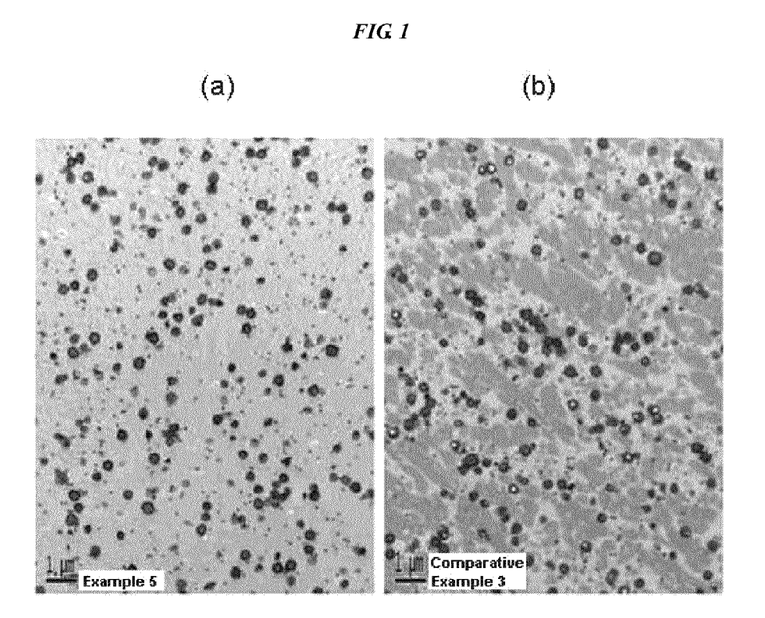
FIG. 1(a) is a transmission electron microscope (TEM) image of a test specimen prepared in Example 5 and FIG. 1(b) is a transmission electron microscope (TEM) image of a test specimen prepared in Comparative Example 3.

The improved compatibility is confirmed by phase separation behavior through TEM images. To analyze phase division behavior, TEM images of resin compositions of Example 5 and Comparative Example 3, respectively, are shown in FIGS. 1(a) and 1(b). Although Comparative Example 3 exhibits a polymethylmethacrylate continuous phase and large domain in a polycarbonate base due to lowered compatibility, Example 5 exhibits improved compatibility since phase division of polymethylmethacrylate is not shown and homogenous phase with polycarbonate is shown.

Test specimens with dimensions of L 90 mm×W 50 mm×T 2.5 mm are used for measuring the following properties.

(1) The compatibility and the transparency of the resin composition are estimated by measuring flow mark, transparency, color and transmittance. The flow mark, transparency and color appeared on the test specimen are measured by the naked eye.

(2) Flexural Modulus: The flexural modulus is measured in accordance with ASTM D790.

(3) Flame Retardancy: The flame retardancy is measured in accordance with UL 94V using a 2.5 mm thick test specimen.

(4) Scratch resistance: The scratch resistance is measured by ball-type scratch profile (BSP) test. The BSP test is conducted by applying a scratch of a length of 10 to 20 mm onto resin specimens with dimensions of L 90 mm×W 50 mm×T 2.5 mm at load of 1,000 g and a scratch speed of 75 mm/min, using a metal spherical tip with a diameter of 0.7 mm and measuring a profile of the applied scratch using a surface profile analyzer (XP-I) manufactured by Ambios Corporation which provides a scratch profile through surface scanning using a metal stylus tip with a diameter of 1-2 μm. The scratch resistance is evaluated based on scratch width of the measured profile.

Figure 2A:
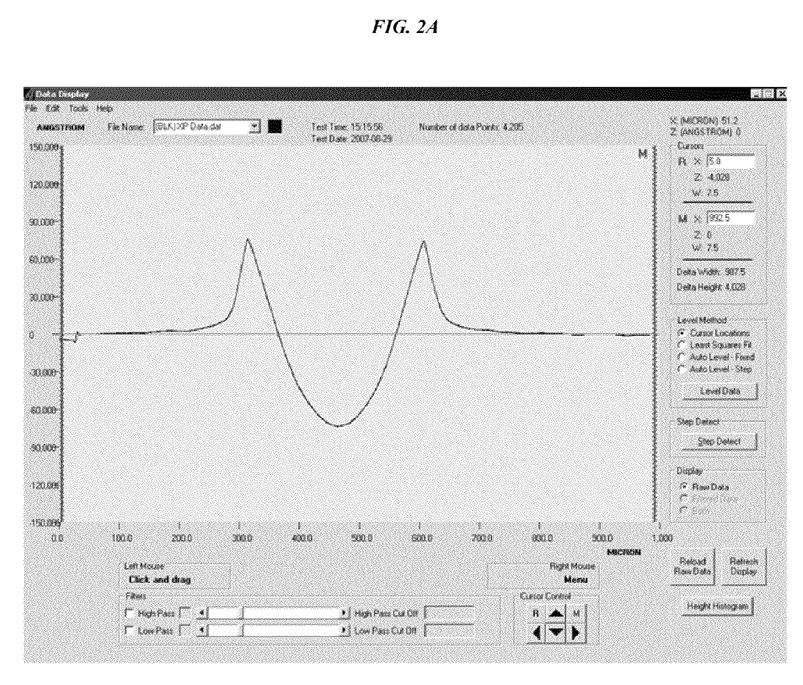
FIG. 2(a) is a scratch profile of a test specimen prepared in Example 1 and FIG. 2(b) is a scratch profile of a test specimen prepared in Comparative Example 1.
Figure 2B:
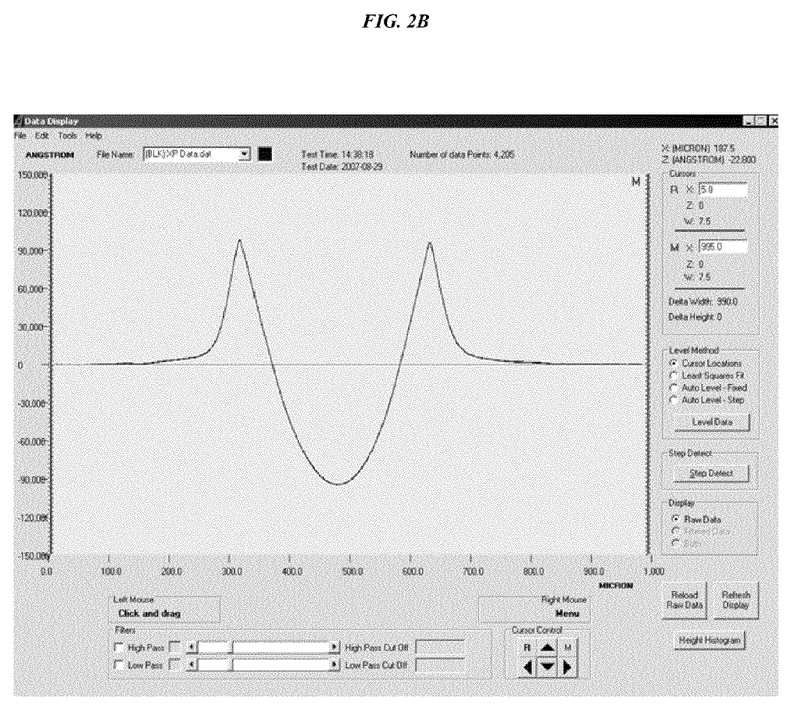

FIG. 2(a) is a scratch profile picture of a test specimen prepared in Example 1 measured by the BSP test, and FIG. 2(b) is a scratch profile picture of a test specimen prepared in Comparative Example 1.

TABLE 1

|  |  | Examples | | | | | Comparative Examples | | |
| --- | --- | --- | --- | --- | --- | --- | --- | --- | --- |
|  |  | 1 | 2 | 3 | 4 | 5 | 1 | 2 | 3 |
| (A)PC |  | 58.4 | 58.4 | 58.4 | 58.4 | 51.1 | 73 | 58.4 | 51.1 |
| (B) | (B1)ABS | 11.2 | 11.2 | 11.2 | 11.2 | 9.8 | 14 | 11.2 | 9.8 |
|  | (B2)SAN | 10.4 | 10.4 | 10.4 | 10.4 | 9.1 | 13 | 10.4 | 9.1 |
| (C) | (C1) | 20 | — | 10 | — | 30 | — | — | — |
|  | (C2) | — | 20 | — | 10 | — | — | — | — |
| (D)Flame Retardant |  | 18 | 18 | 18 | 18 | 18 | 18 | 18 | 18 |
| (E)Acrylic Resin |  | — | — | 10 | 10 | — | — | 20 | 30 |
| Flow Mark |  | X | X | X | X | X | X | ○ | ○ |
| Color(Opaque Milky presence) |  | white | white | white | white | white | white | Opaque milky | Opaque milky |
| Flexural Modulus |  | 26010 | 25970 | 25835 | 25660 | 26570 | 25130 | 25470 | 25730 |
| Flame Retardancy | UL94 (2.5 mm) | V0 | V0 | V0 | V0 | V0 | V0 | V0 | V0 |
| BSP | Width (μm) | 292 | 290 | 288 | 286 | 277 | 316 | 289 | 275 |

As shown in Table 1, the resin compositions in Examples 1 to 5 and Comparative Examples 2-3 employing (meth)acrylic copolymer resin (C) or (meth)acrylic resin (E) exhibit improved scratch resistance as compared with Comparative Example 1, which is also confirmed by the scratch profile (FIG. 2). With respect to flame retardancy, all resin compositions exhibit flame retardancy of V0 or V1 measured in accordance with UL94.

Although Comparative Examples 2 and 3 in which (meth)acrylic resin (E) is used instead of (meth)acrylic copolymer resin (C) show better scratch resistance than Comparative Example 1 using neither (meth)acrylic resin (E) nor (meth)acrylic copolymer resin (C), they show flow mark and opaque appearance due to low compatibility between the resins. The resin compositions in Examples 1 to 5 using the (meth)acrylic copolymer resin (C) do not exhibit flow mark or Opaque Milky appearance due to improved compatibility and refractive index. Thus, good appearance as well as high colorability can be obtained.

Further, Example 1 using (meth)acrylic copolymer resin (C) with a higher refractive index exhibits better compatibility compared to Example 2. Although resin compositions not using the (meth)acrylic resin (E) exhibit better compatibility compared to the resin compositions using both (meth)acrylic copolymer resin (C) and (meth)acrylic resin (E), the resin compositions in Examples 3 to 4 using (meth)acrylic copolymer resin (C) and (meth)acrylic resin (E) together also show improved compatibility, because the average refractive index of the (meth)acrylic resin is increased.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

The invention claimed is:

1. A flame-retardant scratch-resistant thermoplastic resin composition comprising:
a base resin comprising (A) about 20 to about 95% by weight of a polycarbonate resin; (B) about 1 to about 50% by weight of a copolymer resin comprising (B1) about 0 to about 100% by weight of a rubber modified vinyl graft copolymer resin and (B2) about 0 to about 100% by weight of a vinyl copolymer resin; and (C) about 1 to about 50% by weight of a (meth)acrylic copolymer resin with a refractive index of about 1.50 to about 1.59, wherein said (meth)acrylic copolymer resin (C) is a copolymer consisting of (c1) about 50 to about 90% by weight of an aromatic methacrylate, an aliphatic methacrylate, or a mixture thereof represented by the following Chemical Formula 1, Chemical Formula 2, or a mixture thereof and (c2) about 10 to about 50% by weight of a mono-functional unsaturated monomer selected from the group consisting of methacrylic acid ester monomers; acrylic acid ester monomers; unsaturated carboxylic acid monomers; acid anhydride monomers; hydroxyl group containing ester monomers; amide monomers; nitrile monomers; allyl glycidyl ethers; glycidyl methacrylates; and mixtures thereof:

[Chemical Formula 1]

wherein m is an integer from 0 to 10, and X is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group;

[Chemical Formula 2]

wherein m is an integer from 0 to 10, Y is oxygen (O) or sulfur (S), and Ar is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group, and
(D) about 0.1 to about 40 parts by weight of a flame retardant, per 100 parts by weight of a base resin comprising (A)+(B)+(C).

2. The thermoplastic resin composition of claim 1, wherein said base resin further comprises greater than zero but less than about 50% by weight of a (meth)acrylic resin (E).

3. The thermoplastic resin composition of claim 1, wherein said rubber modified vinyl graft copolymer resin (B1) is a copolymer or a mixture of copolymers obtained by graft polymerizing about 50 to about 95% by weight of an aromatic vinyl compound, $C_{1-8}$ (meth)acrylic acid alkyl ester compound, or a mixture thereof and about 5 to about 95% by weight of a vinyl cyanide compound, $C_1$-$C_8$ (meth)acrylic acid alkyl ester compound, maleic anhydride, $C_1$-$C_4$ alkyl- or phenyl N-substituted maleimide, or a mixture thereof, onto about 5 to about 95% by weight of rubbery polymer.

4. The thermoplastic resin composition of claim 1, wherein said vinyl copolymer (B2) is a copolymer or a mixture of copolymers comprising about 50 to about 95% by weight of an aromatic vinyl compound, $C_1$-$C_8$ (meth)acrylic acid alkyl ester compound, or a mixture thereof, and about 5 to about 50% by weight of a vinyl cyanide compound, $C_1$-$C_8$ (meth)acrylic acid alkyl ester compound, maleic anhydride, $C_1$-$C_4$ alkyl- or phenyl N-substituted maleimide, or a mixture thereof.

5. The thermoplastic resin composition of claim 1, wherein said methacrylic acid ester monomer is selected from the group consisting of methyl methacrylate, ethyl methacrylate, propyl methacrylate, butyl methacrylate, phenyl methacrylate, phenoxyethyl methacrylate, benzyl methacrylate, and mixtures thereof; said acrylic acid ester monomer is selected from the group consisting of methyl acrylate, ethyl acrylate, propyl acrylate, butyl acrylate, 2-ethyl hexyl acrylate, and mixtures thereof; said unsaturated carboxylic acid monomer is selected from the group consisting of acrylic acid, methacrylic acid, and mixtures thereof; said acid anhydride monomer is maleic anhydride; said hydroxyl group containing ester monomer is selected from the group consisting of 2-hydroxyethyl acrylate, 2-hydroxypropyl acrylate, monoglycerol acrylate, and mixtures thereof; said amide monomer is selected from the group consisting of acryl amide, methacryl amide, and mixtures thereof; and said nitrile monomer is selected from the group consisting of acrylonitrile, methacrylonitrile, and mixtures thereof.

6. The thermoplastic resin composition of claim 1, wherein said (meth)acrylic copolymer resin (C) has a weight average molecular weight of about 5,000 to about 300,000.

7. The thermoplastic resin composition of claim 1, wherein said flame retardant (D) comprises at least one phosphorus-containing flame retardant, halogen-containing flame retardant, inorganic flame retardant, or a mixture thereof.

8. The thermoplastic resin composition of claim 2, wherein said (meth)acrylic resin (E) is a homopolymer, a copolymer, or a mixture thereof, of a (meth)acrylic monomer or a mixture thereof.

9. The thermoplastic resin composition of claim 8, wherein said (meth)acrylic monomers comprise methyl methacrylate, ethyl methacrylate, n-propyl methacrylate, n-butyl methacrylate, methyl acrylate, ethyl acrylate, propyl acrylate, butyl acrylate, 2-ethylhexyl acrylate, 2-ethylhexyl methacrylate, or a mixture thereof.

10. The thermoplastic resin composition of claim 1, wherein said resin composition further comprises at least one additive selected from the group consisting of surfactants, nucleating agents, coupling agents, fillers, plasticizers, impact modifiers, antimicrobials, release agents, thermal stabilizers, antioxidants, light stabilizers, compatibilizers, inorganic fillers, coloring agents, stabilizers, lubricants, antistatic agents, pigments, dyes, flameproof agents, and mixtures thereof.

11. A molded article produced from the resin composition as defined in claim 1.

12. The thermoplastic resin composition of claim 1, wherein said (meth)acrylic copolymer resin (C) is a copolymer consisting of (c1) about 60 to about 80% by weight of said aromatic methacrylate, aliphatic methacrylate, or mixture thereof and (c2) about 20 to about 40% by weight of said mono-functional unsaturated monomer.

13. The thermoplastic resin composition of claim 1, comprising said flame retardant (D) in an amount of about 15 to about 40 parts by weight.

14. The thermoplastic resin composition of claim 1, wherein said flame retardant (D) is a phosphorus-containing flame retardant.

* * * * *